Oct. 9, 1962 D. D. DE FORD 3,057,183
CHROMATOGRAPHIC ANALYZER
Filed Aug. 22, 1958 2 Sheets-Sheet 1
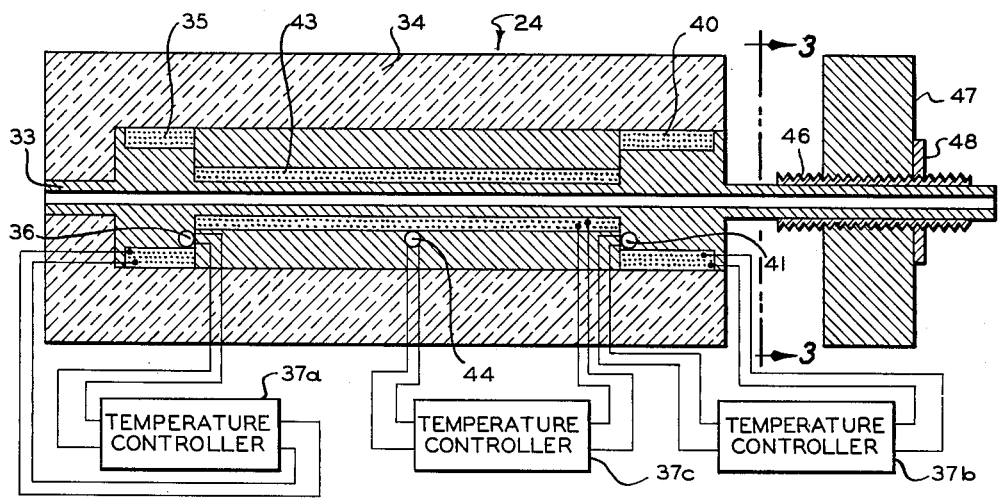
FIG. 2
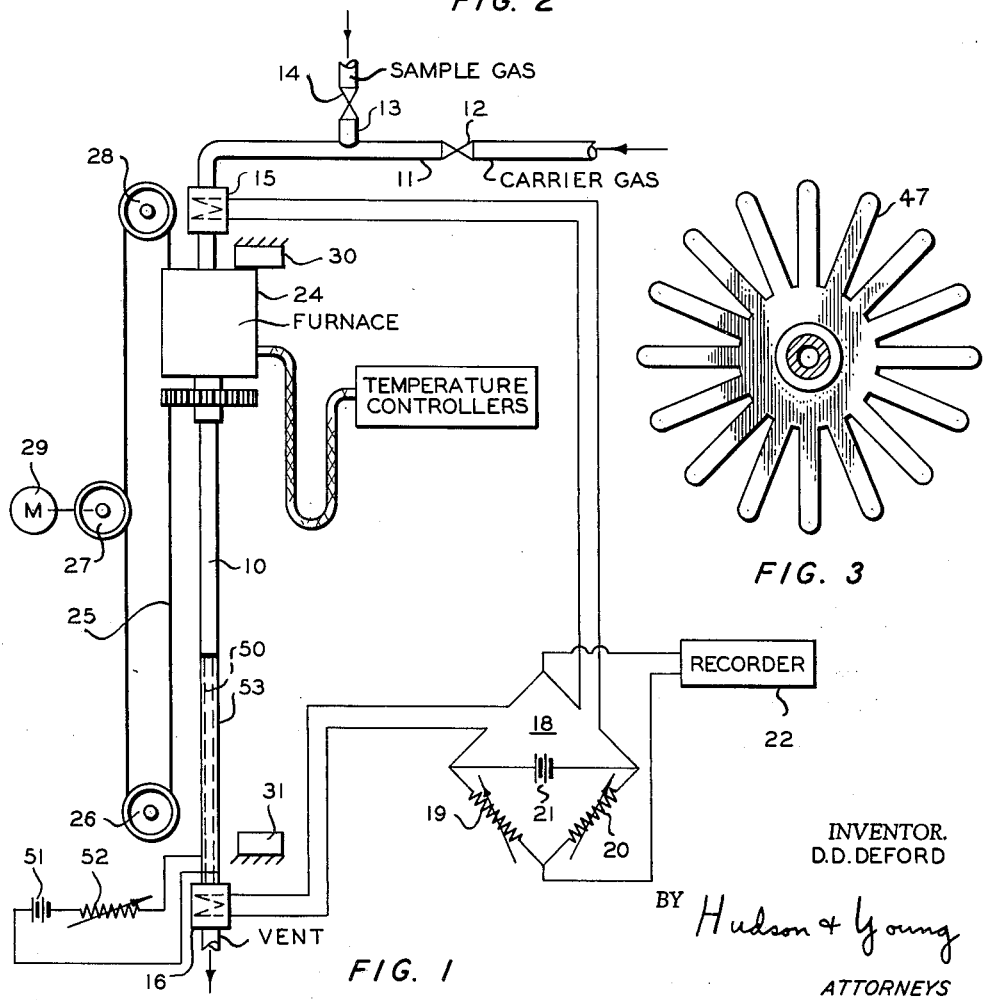
FIG. 3
FIG. 1
INVENTOR.
D.D.DEFORD
BY Hudson & Young
ATTORNEYS INVENTOR.
D.D. DEFORD
BY Hudson & Young
ATTORNEYS

3,057,183
CHROMATOGRAPHIC ANALYZER
Donald D. De Ford, Glenview, Ill., assignor to Phillips Petroleum Company, a corporation of Delaware
Filed Aug. 22, 1958, Ser. No. 756,616
6 Claims. (Cl. 73—23)

This invention relates to the analysis of fluid streams to detect constituents or groups of constituents present therein.

In various industrial and laboratory operations there is a need for analysis procedures which are capable of measuring the concentration of constituents of fluid mixtures. Analyzers employing principles of chromatography are being devloped at the present time to meet this need. One particular type of such analyzers employs a column which is filled with a material that selectively retards the passage therethrough of the constituents of a fluid mixture to be analyzed. A furnace is placed at one end of the column so as to produce a temperature gradient, whereby the inlet end of the column is maintained at the higher temperature. A fluid mixture to be analyzed is introduced into the column at this inlet end. With an arrangement of this type, the most volatile or least strongly adsorbed constituents of the sample move rapidly until they reach colder regions of the column where the speed of movement is decreased due to decreased volatility or greater adsorption. The more strongly adsorbed constituents tend to be held in regions of higher temperature so that a separation is effected. The furnace is then moved along the column so that the individual constituents are desorbed and eluted in succession. Suitable means are provided for detecting the presence of these constituents in the effluent gas from the column.

In an analyzer of this type, the positions of the individual constituents, the separation between constituents, and the width of the zones of the constituents within the column all depend upon the furnace temperature and the tmperature gradient ahead of the furnace. For most analyses, a linear temperature gradient is desirable. The gas which is heated in passing through the furnace carries some of the heat forward, as do the walls of the column and the packing material, so as to establish a temperature gradient ahead of the furnace. The obvious design of a furnace for use in such an analyzer comprises a cylindrical heating element surrounding the column. However, the resulting temperature gradient is not linear because the rate heat is transferred from the exposed column beyond the furnace to the surrounding atmosphere is a function of column temperature. This results in more heat being lost from regions of higher temperature so that the temperature gradient is in the form of an exponential function. Furthermore, the length of the temperature gradient is quite short because of the rapid heat loss from the exposed column. While it might appear that such a furnace design could be improved by insulating the column, the heat transfer from the gas sample to the column still takes place quite rapidly so that the gas is cooled to ambient temperature by the cold column within a very short distance. This situation makes the separation difficult, if not impossible.

In accordance with the present invention, an improved furnace is provided for use with a thermochromatographic analyzer. This furnace comprises an elongated member of heat conductive material which surrounds the analyzer column. The two ends of the elongated member are maintained at constant temperatures which are different from one another so that a temperature gradient is established by the elongated member. The elongated member is surrounded by insulating material so that the temperature gradient remains substantially uniform during the analysis. An auxiliary heater preferably surrounds the elongated member throughout its length to compensate for the transfer of heat between the member and the column. It has been found that such a furnace assembly provides a uniform temperature gradient and permits the analyzer to separate constituents efficiently.

Accordingly, it is an object of this invention to provide an improved analyzer to detect the constituents of fluid mixtures.

Another object is to provide a novel furnace for use with a thermochromatographic analyzer.

Other objects, advantages and features of this invention should become apparent from the following detailed description which is taken in conjunction with the accompanying drawing in which:

FIGURE 1 is a schematic representation of the thermochromatographic analyzer of this invention.

FIGURE 2 is a sectional view of the furnace employed in the analyzer of FIGURE 1.

FIGURE 3 is a view taken along line 3—3 in FIGURE 2.

Figure 4:
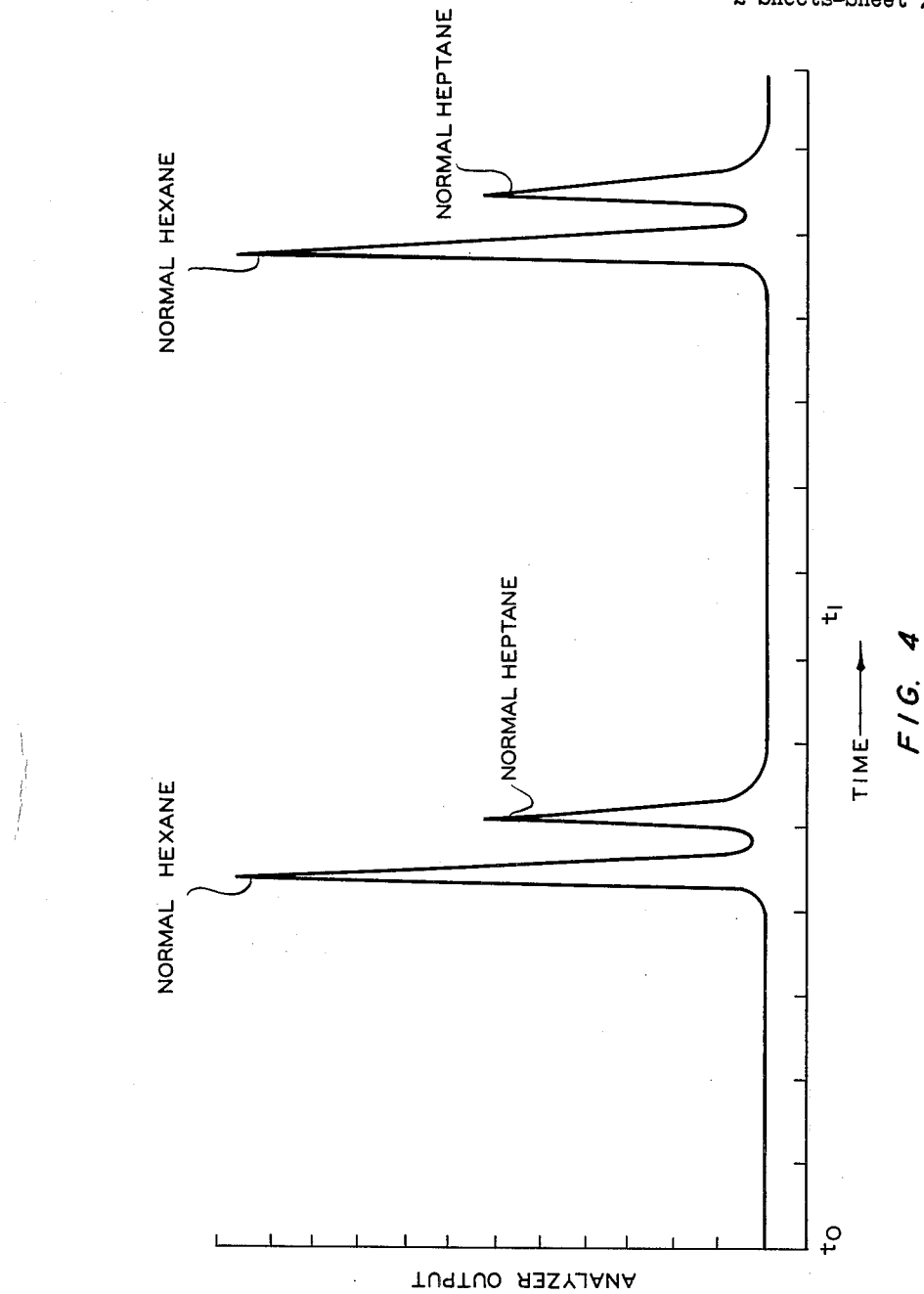
FIGURE 4 is a graphical representation of a typical analysis provided by the analyzer of FIGURE 1.

Referring now to the drawing in detail and to FIGURE 1 in particular, there is shown a vertical column 10 which is filled with a material that selectively retards the passage therethrough of the constituents of a fluid mixture to be analyzed. This column can be filled with an adsorptive material, such as silica gel, alumina or charcoal, or with an inert solid, such as pulverized brick, which is coated by a solvent such as hexadecane or benzyl ether. A conduit 11, which has a valve 12 therein, communicates with the upper end of column 10 to introduce a carrier gas into the column. Examples of suitable carrier gases include helium, hydrogen, nitrogen, air, argon and carbon dioxide. A gas sample to be analyzed is introduced into the top of column 10 through a conduit 13 which has a valve 14 therein. In some analyses, the gas sample alone can be introduced into column 10. Valves 12 and 14 can represent a rotary sample valve, if desired, to introduce predetermined volumes of gas sample into column 10. First and second thermal conductivity cells 15 and 16 are positioned adjacent the respective inlet and outlet ends of column 10. These thermal conductivity cells preferably comprise temperature sensitive resistance elements which are connected in adjacent arms of a Wheatstone bridge network 18. Network 18 includes balancing resistors 19 and 20 and a voltage source 21 connected across first opposite terminals. The second opposite terminals of the bridge network are connected to a recorder 22 which provides an indication of the difference between the thermal conductivities of the gases flowing through cells 15 and 16.

An annular furnace 24 surrounds column 10 and is adapted to move longitudinally thereof. A cable 25 is attached to furnace 24 and extends about a stationary guide wheel 26, a power driven wheel 27 and a second stationary guide wheel 28 back to furnace 24. Wheel 27 is adapted to be rotated by a reversible motor 29 which serves to move furnace 24 downwardly or upwardly. Bumpers 30 and 31 are provided to stop the furnace at the two ends of the column.

Furnace 24 is illustrated in detail in FIGURES 2 and 3. This furnace is provided with a central diffuser 33 which is formed of a metal such as aluminum that has good heat conducting properties. Diffuser 33 is surrounded by a mass of heat insulating material 34. A first electrical heating coil 35 is mounted on diffuser 33 near the end of the furnace which is adjacent the inlet end of column 10. A temperature sensing element 36 is mounted within diffuser 33 adjacent heating coil 35. This sensing element actuates a temperature controller 37 which regulates the amount of current supplied to heater 35 so as to maintain a predetermined constant temperature at the end of the diffuser adjacent element 36. Any conventional temperature control mechanism known in the art can be employed for this purpose. A second electrical heating coil 40 is mounted on diffuser 33 adjacent the second end of furnace 24. A temperature sensing element 41 is mounted within the diffuser adjacent coil 40 to actuate a temperature controller 37b to regulate the amount of current supplied to coil 40. The second end of the diffuser is thus maintained at a constant predetermined temperature. The temperature adjacent element 41 normally is maintained lower than the temperature at the region of element 36 so that a temperature differential exists along the diffuser. An elongated electrical heating coil 43 is positioned within diffuser 33 between heating coils 35 and 40. A temperature sensing element 44 is positioned within diffuser 33 near the mid-point thereof so as to actuate a temperature controller 37c to regulate the current supplied to coil 43. The temperature in the region of element 44 is maintained at a value intermediate the temperatures at the regions of elements 36 and 41.

Diffuser 33 extends beyond heating coil 40 and is provided with a threaded sleeve 46 which carries a finned heat radiator 47. The position of radiator 47 on the diffuser can thus be adjusted, and the radiator can be retained in place by means of a lock nut 48. The radiator is desirable to prevent the temperature at the lower end of diffuser 33 from increasing above the selected value. Radiator 47 normally is placed a distance from diffuser 33 so that the lower end of the diffuser is cooled to a temperature below the desired temperature at this point when heater 40 is deenergized.

At the beginning of an analysis cycle, furnace 24 is positioned adjacent the inlet end of column 10, as illustrated in FIGURE 1. A gas sample to be analyzed is introduced into the column, either alone or in admixture with the carrier gas, so as to flow past furnace 24. The least strongly adsorbed constituents of the sample stream move rapidly through the conduit until they reach relatively cool regions. The speeds of movement of the constituents are then slowed down due to the greater adsorption. The more strongly adsorbed constituents tend to be retained at regions of higher temperature. Motor 29 is then energized to move furnace 24 downwardly. This movement of the heating zone tends to force the constituents of the sample gas through the column with the result that the constituents are eluted in sequence. The signal applied to recorder 22 is representative of the difference between the thermal conductivities of the gases flowing through respective cells 15 and 16 and thus provides an indication of the individual constituents as they appear in the column effluent.

In some operations, satisfactory results can be obtained by constructing the furnace without heating coil 43. This is particularly true when the speed of movement of the furnace is quite slow. However, in most operations this auxiliary heating coil is desirable in order to compensate for loss of heat from the diffuser into the column. It should be evident that such heat loss tends to destroy the linearity of the temperature gradient because the heat transfer into the column is greater at regions of higher temperature. Sufficient heat can be supplied by this auxiliary winding to compensate exactly for the heat transfer into the column.

In one specific embodiment of this invention, the total length of the region of diffuser 33 which is surrounded by insulation 34 was approximately 11 inches. Heating coils 35, 43 and 40 had respective lengths of approximately one inch, seven and one-half inches and one and one-half inches. Heating coils 35 and 40 were each rated at approximately 200 watts. Heating coil 43 was rated at approximately 5 watts per centimeter of length. This furnace was employed in conjunction with a column 10 which had an inside diameter of ¼ inch and which was filled with silica gel pellets. A fluid mixture comprising approximately 95 percent helium as carrier gas and approximately 5 percent of a mixture of normal hexane and normal heptane was supplied to the inlet of column 10 at a rate of approximately 30 cubic centimeters per minute. Furnace 24 was moved at a velocity of approximately 6 inches per minute. The maximum temperature at the upper end of diffuser 33 was approximately 200° F. and the temperature gradient through the diffuser was approximately 5° F. per inch. The resulting signal applied to recorder 24 was of the form shown in FIGURE 4. It can be seen that normal hexane was eluted first, followed by normal heptane. Two separate analyses are shown in FIGURE 4.

In normal operation, it is desirable that furnace 24 be positioned at the top of column 10 and retained in place until temperature equilibrium is reached in the column. Heater 43 should be turned off at this time, or at least should be turned low if heater is required to compensate for heat loss through the surrounding insulation. Carrier gas can be passed through column 10 at this time, if desired. Once temperature equilibrium is established, the sample to be analyzed is introduced into the column, heater 43 is turned on and the furnace is set into motion.

Since the furnace must be able to pass completely over the bottom end of column 10, an auxiliary outlet conduit 50 is provided. If the sample mixture being analyzed contains high boiling constituents, it may be necessary to heat conduit 50 to prevent condensation. This can be accomplished by resistance heating wherein the wall of conduit 50 forms the resistance element. A current source 51 and an adjustable resistor 52 are connected in circuit with the wall of conduit 50 to provide heating current. Conduit 50 should not be heated unless necessary because any heat applied at this point tends to upset the temperature gradient across the furnace as the furnace passes over the end of column 10. Conduit 50 can advantageously be surrounded by a conduit 53 which has a heat capacity per unit length equal to that of column 10 and the packing included therein. The inner diameter of diffuser 33 should be as nearly equal to the external diameter of column 10 as is mechanically feasible to promote heat transfer between these two elements.

From the foregoing description it should be evident that there is provided in accordance with this invention an improved furnace for use with a thermochromatographic analyzer. This furnace is capable of establishing a linear temperature gradient between the two ends thereof so that a linear temperature gradient can be maintained along the chromatographic column.

While the invention has been described in conjunction with a present preferred embodiment, it should be evident that it is not limited thereto.

What is claimed is:

1. A thermochromatographic analyzer heater comprising an elongated member of heat conductive material having a central opening therethrough longitudinally of said member, a first heating element in thermal contact with one end of said member, a second heating element in thermal contact with the second end of said member, heat insulating material surrounding said member, a second elongated member of heat conductive material having a central opening therethrough forming an extension of the first-mentioned member, and a third member of heat conductive material extending radially from said second member to form a heat radiator.

2. The heater of claim 1 further comprising means to adjust the position of said third member on said second member relative to the first-mentioned member.

3. A thermochromatographic analyzer comprising an elongated conduit containing a material which selectively retards passage therethrough of the constituents of a fluid mixture to be analyzed, means to introduce a fluid mixture to be analyzed into one end of said column, an elongated member of heat conductive material having a central opening therethrough longitudinally of said member, said member enclosing said conduit, a first heating element in thermal contact with one end of said member, a second heating element in thermal contact with the second end of said member, a third heating element in thermal contact with said member intermediate the ends thereof, a first temperature sensing means in thermal contact with said one end of said member, means responsive to said first temperature sensing means to supply a heating medium to said first heating element at a rate so as to maintain said one end of said member at a first predetermined temperature, a second temperature sensing means in thermal contact with said second end of said member, means responsive to said second temperature sensing means to supply a heating medium to said second heating element at a rate so as to maintain said second end of said member at a second predetermined temperature, a third temperature sensing means in thermal contact with said member intermediate the ends thereof, means responsive to said third temperature sensing means to supply a heating medium to said third heating element at a rate so as to maintain the region of said member intermediate the ends thereof at a third predetermined temperature, heat insulating material surrounding said member, means to move said member longitudinally of said conduit, and means to detect the constituents in the effluent from the second end of said column.

4. A thermochromatographic analyzer comprising an elongated conduit containing a material which selectively retards passage therethrough of the constituents of a fluid mixture to be analyzed, means to introduce a fluid mixture to be analyzed into one end of said column, an elongated member of heat conductive material having a central opening therethrough longitudinally of said member, said member enclosing said conduit, a first heating element in thermal contact with one end of said member, a second heating element in thermal contact with the second end of said member, heat insulating material surrounding said member, means to move said member longitudinally of said conduit, a second conduit of external diameter substantially equal to the external diameter of the first-mentioned conduit, the first end of said second conduit being attached to the second end of the first-mentioned conduit to form an extension thereof so that said member can move over said second conduit, means to heat said second conduit, and means to detect the constituents in the effluent from the second end of said second conduit.

5. A thermochromatographic analyzer comprising an elongated conduit containing a material which selectively retards passage therethrough of the constituents of a fluid mixture to be analyzed, means to introduce a fluid mixture to be analyzed into one end of said column, a first elongated member of heat conductive material having a central opening therethrough longitudinally of said first member, said first member enclosing said conduit, a second elongated member of heat conductive material having a central opening therein forming an extension of said first member, a first heating element in thermal contact with one end of said first member, a second heating element in thermal contact with the second end of said first member, heat insulating material surrounding said first member, means to move said first member longitudinally of said conduit, a third member of heat conductive material extending radially from said second elongated member to form a heat radiator, and means to detect the constituents in the effluent from the second end of said column.

6. A thermochromatographic analyzer comprising an elongated conduit containing a material which selectively retards passage therethrough of the constituents of a fluid mixture to be analyzed, means to introduce a fluid mixture to be analyzed into one end of said column, an elongated member of heat conductive material having a central opening therethrough longitudinally of said member, said member enclosing said conduit, a first heating element in thermal contact with one end of said member, a second heating element in thermal contact with the second end of said member, heat insulating material surrounding said member, means to move said member longitudinally of said conduit, means to detect the constituents in the effluent from the second end of said column, a first temperature sensing means in thermal contact with said one end of said member, means responsive to said first temperature sensing means to supply a heating medium to said first heating element at a rate so as to maintain said one end of said member at a first predetermined temperature, a second temperature sensing means in thermal contact with said second end of said member, and means responsive to said second temperature sensing means to supply a heating medium to said second heating element at a rate so as to maintain said second end of said member at a second predetermined temperature.

References Cited in the file of this patent

UNITED STATES PATENTS

| | | |
|---|---|---|
| 2,279,368 | Dietert | Apr. 14, 1942 |
| 2,398,818 | Turner | Apr. 23, 1946 |
| 2,491,210 | Rennie | Dec. 13, 1949 |
| 2,820,132 | Krause | Jan. 14, 1958 |
| 2,826,908 | Skarstrom | Mar. 18, 1958 |

OTHER REFERENCES

Book: Vapor Phase Chromatography, by Desty, Butterworth's Scientific Publications, London, 1956, pages 214, 215. (Copy in Patent Office Library.)

Book: Gas Chromatography, Keulemans, Reinhold Pub. Co., New York, 1957, page 187. (Copy in Patent Office Library.)

Article by N. M. Turkeltaub et al.: Published in Zavodskaya Lab., vol. 23, pages 1120–1124, 1957.